United States Patent
Ferris et al.

(10) Patent No.: US 8,612,566 B2
(45) Date of Patent: *Dec. 17, 2013

(54) SYSTEMS AND METHODS FOR MANAGEMENT OF VIRTUAL APPLIANCES IN CLOUD-BASED NETWORK

(75) Inventors: James Michael Ferris, Cary, NC (US); David P. Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,394

(22) Filed: Jul. 20, 2012

(65) Prior Publication Data

US 2012/0284405 A1    Nov. 8, 2012

Related U.S. Application Data

(63) Continuation of application No. 12/128,233, filed on May 28, 2008, now Pat. No. 8,239,509.

(51) Int. Cl.
*G06F 15/173* (2006.01)
*G06F 15/177* (2006.01)
*G06F 9/44* (2006.01)

(52) U.S. Cl.
USPC ............ 709/223; 709/222; 709/224; 717/171

(58) Field of Classification Search
USPC ........ 709/222, 223, 224; 717/171; 718/1, 100
See application file for complete search history.

(56) References Cited

U.S. PATENT DOCUMENTS

| | | | |
|---|---|---|---|
| 6,272,677 B1 * | 8/2001 | Lam et al. ..................... | 717/170 |
| 6,463,457 B1 | 10/2002 | Armentrout et al. | |
| 6,801,937 B1 | 10/2004 | Novaes et al. | |
| 7,171,476 B2 | 1/2007 | Maeda et al. | |
| 7,313,796 B2 | 12/2007 | Hamilton et al. | |
| 7,439,937 B2 * | 10/2008 | Ben-Shachar et al. ......... | 345/1.1 |
| 7,529,785 B1 | 5/2009 | Spertus et al. | |
| 7,546,462 B2 | 6/2009 | Upton | |
| 7,596,620 B1 | 9/2009 | Colton et al. | |
| 8,255,529 B2 | 8/2012 | Ferris et al. | |
| 8,364,819 B2 | 1/2013 | Ferris et al. | |
| 8,402,139 B2 | 3/2013 | Ferris et al. | |
| 2001/0039497 A1 | 11/2001 | Hubbard | |
| 2002/0069276 A1 * | 6/2002 | Hino et al. .................... | 709/223 |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |

(Continued)

OTHER PUBLICATIONS

USPTO, Office Action for U.S. Appl. No. 12/128,768 mailed Jul. 6, 2011.

(Continued)

*Primary Examiner* — Aaron Strange
(74) *Attorney, Agent, or Firm* — Lowenstein Sandler LLP

(57) ABSTRACT

Embodiments relate to systems and methods for instantiating and operating a virtual appliance monitor in a network cloud environment. A method includes receiving, by a virtual appliance monitor, appliance state information representing an execution state of a virtual appliance of a set of virtual appliances instantiated in the network cloud, wherein the virtual appliance monitor is instantiated separately from the set of virtual appliances and configured to monitor the set of virtual appliances. The method further includes performing a control action to alter the execution state of the virtual appliance in response to conditions detected in the appliance state information.

14 Claims, 5 Drawing Sheets

(56) References Cited

U.S. PATENT DOCUMENTS

| | | |
|---|---|---|
| 2004/0049573 A1 | 3/2004 | Olmstead et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1* | 12/2004 | Knauerhase et al. ............ 718/1 |
| 2005/0060704 A1 | 3/2005 | Bulson et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1* | 4/2006 | Garrett ........................ 709/223 |
| 2006/0085824 A1 | 4/2006 | Bruck et al. |
| 2006/0130144 A1* | 6/2006 | Wernicke ....................... 726/24 |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0034364 A1 | 2/2008 | Lam et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1* | 4/2008 | Lam et al. ........................ 718/1 |
| 2008/0091613 A1 | 4/2008 | Gates et al. |
| 2008/0104608 A1 | 5/2008 | Hyser et al. |
| 2008/0215796 A1* | 9/2008 | Lam et al. ..................... 711/100 |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1* | 8/2009 | Gebhart et al. ............... 718/100 |
| 2009/0222805 A1 | 9/2009 | Faus et al. |
| 2009/0228950 A1 | 9/2009 | Reed et al. |
| 2009/0248693 A1 | 10/2009 | Sagat et al. |
| 2009/0249287 A1 | 10/2009 | Patrick |
| 2009/0260007 A1* | 10/2009 | Beaty et al. ........................ 718/1 |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan |
| 2011/0055588 A1 | 3/2011 | DeHaan |
| 2011/0107103 A1 | 5/2011 | DeHaan et al. |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131316 A1 | 6/2011 | Ferris et al. |
| 2011/0131335 A1 | 6/2011 | Spaltro et al. |
| 2011/0131499 A1 | 6/2011 | Ferris et al. |
| 2011/0213686 A1 | 9/2011 | Ferris et al. |
| 2011/0213687 A1 | 9/2011 | Ferris et al. |
| 2011/0213691 A1 | 9/2011 | Ferris et al. |
| 2011/0213719 A1 | 9/2011 | Ferris et al. |
| 2011/0214124 A1 | 9/2011 | Ferris et al. |
| 2011/0295727 A1 | 12/2011 | Ferris et al. |
| 2011/0295986 A1 | 12/2011 | Ferris et al. |
| 2011/0295999 A1 | 12/2011 | Ferris et al. |
| 2011/0296000 A1 | 12/2011 | Ferris et al. |
| 2011/0296019 A1 | 12/2011 | Ferris et al. |
| 2011/0296023 A1 | 12/2011 | Ferris et al. |
| 2011/0296370 A1 | 12/2011 | Ferris et al. |
| 2012/0130873 A1 | 5/2012 | Morgan |
| 2012/0131161 A1 | 5/2012 | Ferris et al. |
| 2012/0131173 A1 | 5/2012 | Ferris et al. |
| 2012/0131174 A1 | 5/2012 | Ferris et al. |
| 2012/0131176 A1 | 5/2012 | Ferris et al. |
| 2012/0131193 A1 | 5/2012 | Ferris et al. |
| 2012/0131194 A1 | 5/2012 | Morgan |
| 2012/0131195 A1 | 5/2012 | Morgan |
| 2012/0136989 A1 | 5/2012 | Ferris et al. |
| 2012/0137001 A1 | 5/2012 | Ferris et al. |
| 2012/0137002 A1 | 5/2012 | Ferris et al. |
| 2012/0221454 A1 | 8/2012 | Morgan |
| 2012/0226796 A1 | 9/2012 | Morgan |
| 2012/0226808 A1 | 9/2012 | Morgan |
| 2012/0304170 A1 | 11/2012 | Morgan |
| 2012/0304191 A1 | 11/2012 | Morgan |
| 2012/0311106 A1 | 12/2012 | Morgan |
| 2012/0311153 A1 | 12/2012 | Morgan |
| 2012/0311154 A1 | 12/2012 | Morgan |
| 2012/0311571 A1 | 12/2012 | Morgan |

OTHER PUBLICATIONS

USPTO, Final Office Action for U.S. Appl. No. 12/128,768 mailed Dec. 15, 2011.
USPTO, Advisory Action for U.S. Appl. No. 12/128,768 mailed Feb. 17, 2012.
USPTO, Notice of Allowance for U.S. Appl. No. 12/128,768 mailed Aug. 24, 2012.
USPTO, Final Office Action for U.S. Appl. No. 12/128,233 mailed Oct. 29, 2011.
USPTO, Office Action for U.S. Appl. No. 12/128,233 mailed May 11, 2011.
USPTO, Final Office Action for U.S. Appl. No. 12/128,233 mailed Aug. 11, 2011.
USPTO, Advisory Action for U.S. Appl. No. 12/128,233 mailed Jan. 24, 2011.

(56) References Cited

OTHER PUBLICATIONS

USPTO, Notice of Allowance for U.S. Appl. No. 12/128,233 mailed Mar. 30, 2012.
USPTO, Office Action for U.S. Appl. No. 12/128,233 mailed Mar. 2, 2011.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc. www.rpath.com, 6 pages.

* cited by examiner

SYSTEMS AND METHODS FOR MANAGEMENT OF VIRTUAL APPLIANCES IN CLOUD-BASED NETWORK

RELATED APPLICATION

This application is a continuation of U.S. patent application Ser. No. 12/128,233, filed on May 28, 2008, the entirety of which is incorporated herein by reference.

FIELD

The present teachings relate to management of virtual appliances in a cloud-based network, and more particularly to platforms and techniques for establishing a cloud-based virtual appliance monitor to manage virtual appliances instantiated in a cloud.

BACKGROUND OF RELATED ART

Software appliances generally involve the encapsulation of a pre-defined application or applications with a reduced version of an operating system (OS), such as the Linux™ operating system. Software appliances in one regard thereby represent a relatively compact, ready-to-install application solution and can be distributed via media such as CD-ROM discs, or downloaded for installation. Software appliances can be distributed and installed in a variety of environments, including stand-alone and networked environments. A population of software appliances can be managed on a network from a centralized monitor or host, including to track the software provisioning, user authorizations, execution states, and other attributes of the deployed appliances.

In cases, however, a network administrator may wish to set up a set of software appliances specifically in a network cloud environment. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis. The user can lease or subscribe to the set of resources needed to build and run the set of instantiated virtual machines on a comparatively short-term basis, such as hours or days, for their intended application. The advent of cloud-based computing architectures has opened new possibilities for the rapid and scalable deployment of virtual Web stores, media outlets, and other online sites or services.

In the context of a set of virtual appliances that are instantiated in a cloud environment, issues in the configuration and deployment of the appliances can arise. For instance, while on-premise appliance monitors are known for the implementation of hardware-based appliance installations, in the case of virtual appliances a user may not have access to an on-premise server or other platform to execute appliance monitoring and control. Even if the user had access to a regular appliance monitor platform, that platform typically would be configured to connect to physical instances of the set of appliances, as opposed to transient virtual appliances executing in the cloud. It may be desirable to provide methods and systems for the management of cloud-based virtual appliances that themselves can be supported by the cloud, as opposed to requiring on-premise infrastructure.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for management of virtual appliances in cloud-based network. More particularly, embodiments relate to a network cloud environment in which a set of virtual appliances can be instantiated, as one type of virtual machine or resource. In addition to populating the virtual appliances in the cloud, in embodiments a virtual appliance monitor can also be instantiated in the cloud. The virtual appliance monitor can communicate with the set of virtual appliances, and monitor those virtual appliances to detect, monitor and update the provisioning, configuration, and execution state of the appliances. For example, the set of instantiated virtual appliances can be monitored to update installed applications, software or other license management, to detect malicious software, to manage user registrations, meter and record subscription charges, and other supervisory network tasks. The virtual appliance monitor can, in embodiments, store data reflecting the state of the virtual appliances to a permanent data store external to the cloud. In embodiments, the image of the virtual appliance monitor can be migrated from a hardware installation performing the same or similar tasks, which functions can then be supported in the cloud. These and other embodiments described herein address the various noted shortcomings in known appliance management technology, and provide a user or network operator with enhanced capabilities, including the configuration or migration of appliance management infrastructure to the cloud.

Reference will now be made in detail to exemplary embodiments of the present teachings, which are illustrated in the accompanying drawings. Where possible the same reference numbers will be used throughout the drawings to refer to the same or like parts.

Figure 1:
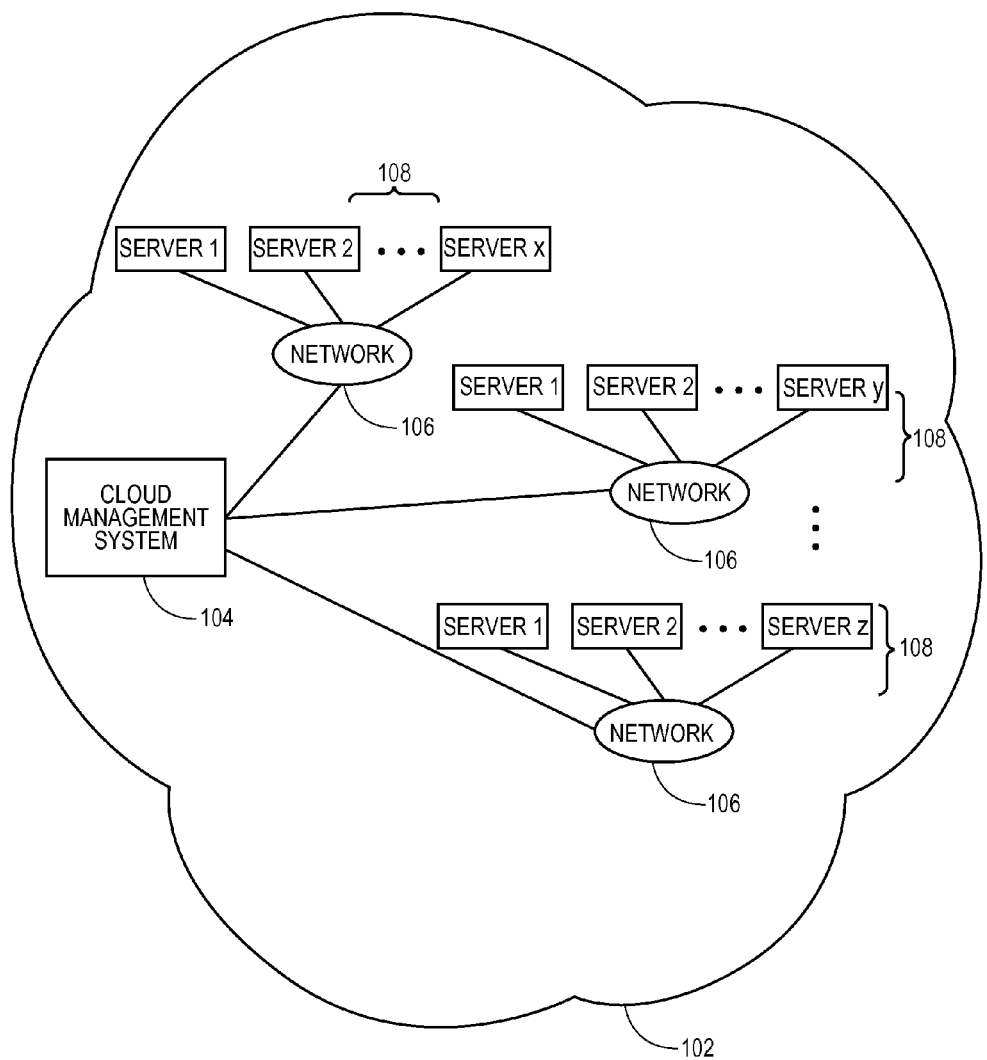
FIG. 1 illustrates an overall cloud system architecture in which various embodiments of the present teachings can be practiced.

Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
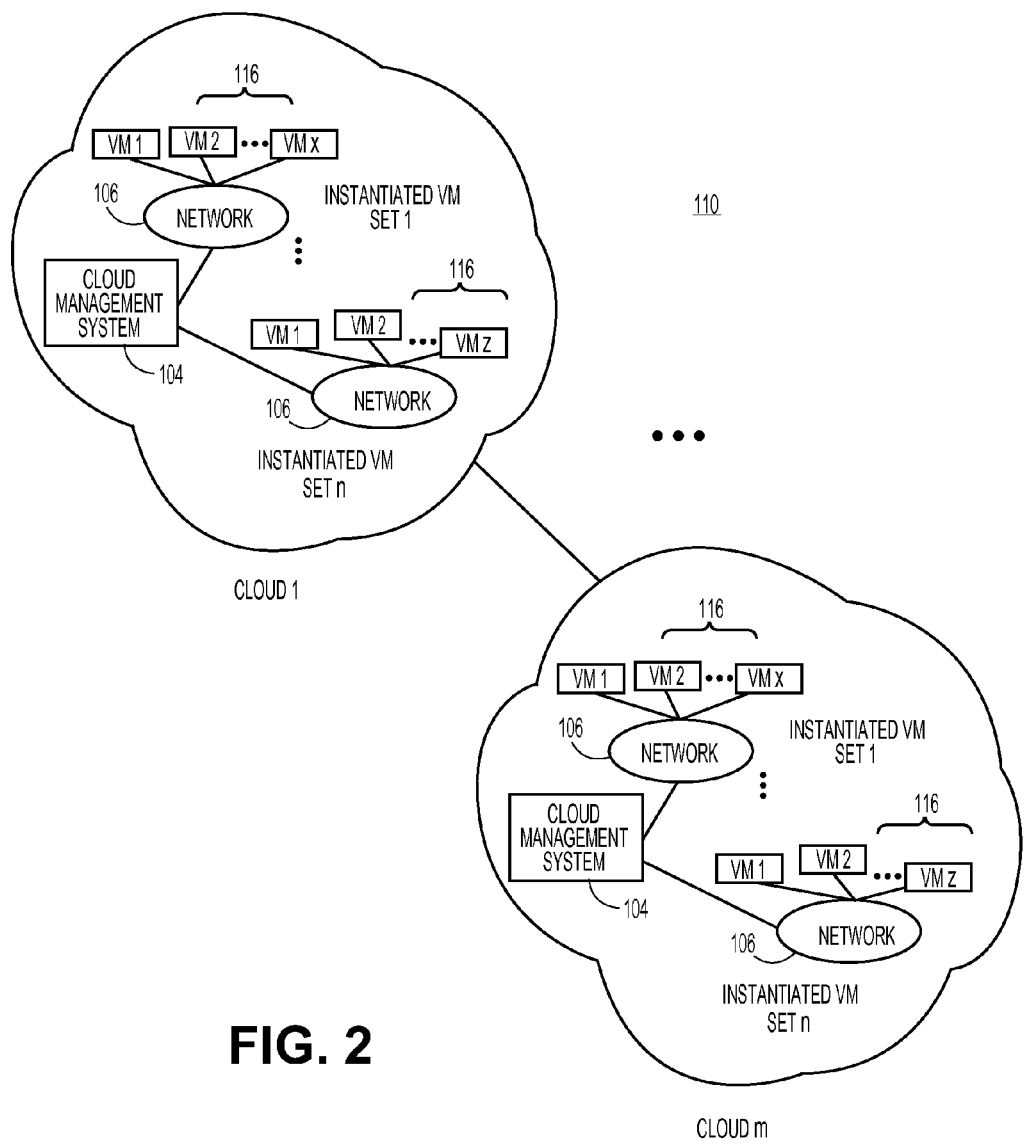
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on one or more networks 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that network cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
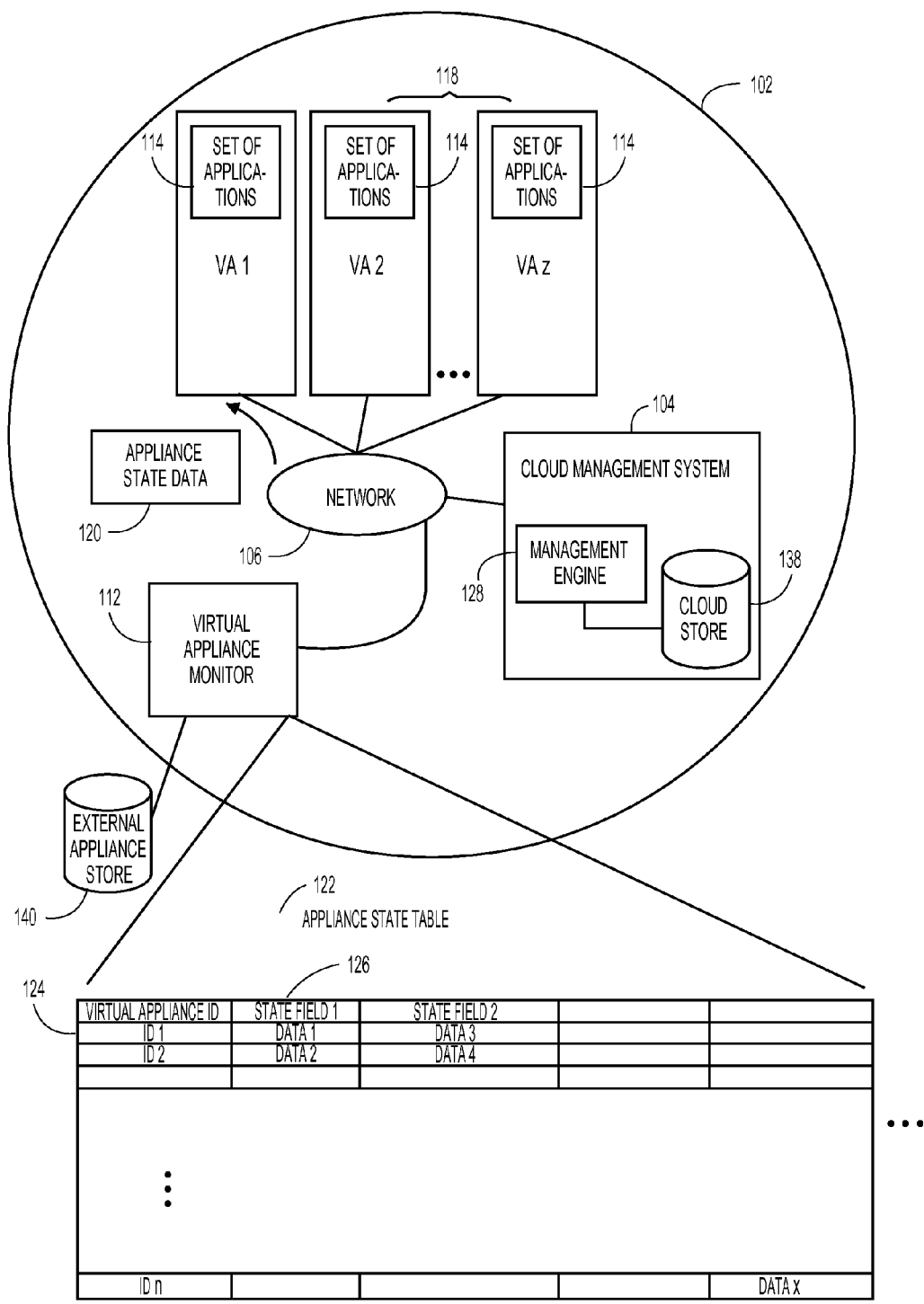
FIG. 3 illustrates a network configuration in which a cloud management system can perform various appliance management functions, according to various embodiments.

FIG. 3 illustrates a configuration of a cloud management system and associated resources configured to build and populate a set of virtual appliances 118 in cloud 102 operating under control of a virtual appliance monitor 112, according to embodiments of the present teachings. In embodiments as shown, virtual appliances as a specific type of virtual machine can be built and instantiated. In embodiments as shown, a set of virtual appliances 118 can be built and instantiated at the request of a user or operator via a cloud management system 104. Each appliance in the set of virtual appliances 118 can be provisioned with a set of applications 114, such as media, messaging, or other applications or software as well as supporting operating system, processing power, and other resources. In embodiments, each of the appliances in set of virtual appliances 118 can be provisioned or configured with the same set of applications 114 and/or other resources, or in embodiments can be provisioned or configured with different applications and/or other resources.

The set of virtual appliances 118 communicates with a virtual appliance monitor 112 configured to monitor and manage the set of virtual appliances 118. Virtual appliance monitor 112 can be instantiated in cloud 102 by cloud management system 104. Virtual appliance monitor 112 can communicate appliance state data 120 to or from any of the appliances in set of virtual appliances 118. Appliance state data 120 can contain data relating to the configuration state, execution state, input/output state, or other state of any one or more of the appliances in set of virtual appliances 118. In embodiments, virtual appliance monitor 112 can poll the appliances in set of virtual appliances 118 on a regular basis to extract appliance state data 120. In embodiments, virtual appliance monitor 112 can transmit a request for appliance state data 120 on an event-triggered basis, such as when a fault is registered in a virtual appliance in set of virtual appliances 118. In embodiments, any one or more of the virtual appliances in set of virtual appliances 118 can also or instead transmit or "push" appliance state data 120 to virtual appliance monitor 112, at regular periods, or based on events or other criteria.

Virtual appliance monitor 112 can receive appliance state data 120 and perform monitoring and management of the set of virtual appliances 118. Virtual appliance monitor 112 can, for instance, register and manage the software license or other entitlement status of the set of virtual appliances 118. Virtual appliance monitor 112 can similarly manage the relationship between the set of virtual appliances 118 and networks to which those appliances or their users are registered or subscribed, such as Red Hat Network™ maintained by Red Hat, Inc. of Raleigh, N.C., or others. Virtual appliance monitor 112 can, also for example, detect fault conditions in the set of applications 114 or other software operating in the set of virtual appliances 118. In embodiments virtual appliance monitor 112 can terminate or suspend faulted applications or other software. For further example, virtual appliance monitor 112 can detect the signature of a virus or other malicious process, and for instance terminate any appliance identified to be affected by such infections. For yet further example, virtual appliance monitor 112 can manage the set of applications 114 installed in set of virtual appliances 118, and for example perform updates to versions of applications or other software provisioned to the set of virtual appliances 118. Virtual appliance monitor 112 can still further manage user identity, account and access privileges to the set of virtual appliances 118. Virtual appliance monitor 112 can perform one or more control actions in response to conditions detected in appliance state data 120 or otherwise, for instance by issuing commands or instructions via network 106 to one or more appliances in set of virtual appliances 118. Other management and administrative functions can be performed by virtual appliance monitor 112. In embodiments, appliance management functions and protocols such as those described in co-pending U.S. patent application Ser. No. 12/128,768 filed May 29, 2008, entitled "Systems and Methods for Identification and Management of Cloud-Based Virtual Machines", which application is incorporated herein by reference, can also be used.

In embodiments, virtual appliance monitor 112 can store appliance state data 120 and other information associated with set of virtual appliances 118 in an appliance state table 122. Appliance state table 122 can contain a virtual appliance ID field 124 and a set of appliance state fields 126, reflecting the execution state, configuration state, input/output state, or other information associated with set of virtual appliances 118. In embodiments, appliance state table 122 can be stored to external appliance store 140. In embodiments, appliance state table 122 can be built and populated without being committed to permanent storage.

In embodiments, virtual appliance monitor 112 can store information related to set of virtual appliances 118, including appliance state data 120 and a history or log of control actions, to an external appliance store 140 located outside cloud 102. External appliance store 140 can be or include, for example, an on-premise database operated by the user or operator of set of virtual appliances 118. In embodiments as shown, virtual appliance monitor 112 can itself be instantiated and managed by cloud management system 104, using management engine 128, cloud store 138 and other resources to track and support the virtual appliance monitor 112. Virtual appliance monitor 112 can for example be built, instantiated and operated on a subscription or usage basis, for which cloud management system 104 records the execution time, duration, input/output bandwidth, or other operating parameters of virtual appliance monitor 112 to accrue subscription charges or otherwise account for the use of virtual appliance monitor 112. In embodiments, when the subscription period for set of virtual appliances 118 and/or virtual appliance monitor 112 has expired, or other termination events take place, cloud management system 104 can deactivate or terminate set of virtual appliances 118 and/or virtual appliance monitor 112, as appropriate. It may be noted that in embodiments, set of virtual appliances 118 can interact with other appliances or other types of virtual machines or resources, both inside the cloud 102 in which set of virtual appliances 118 were instantiated as well as outside cloud 102.

Figure 4:
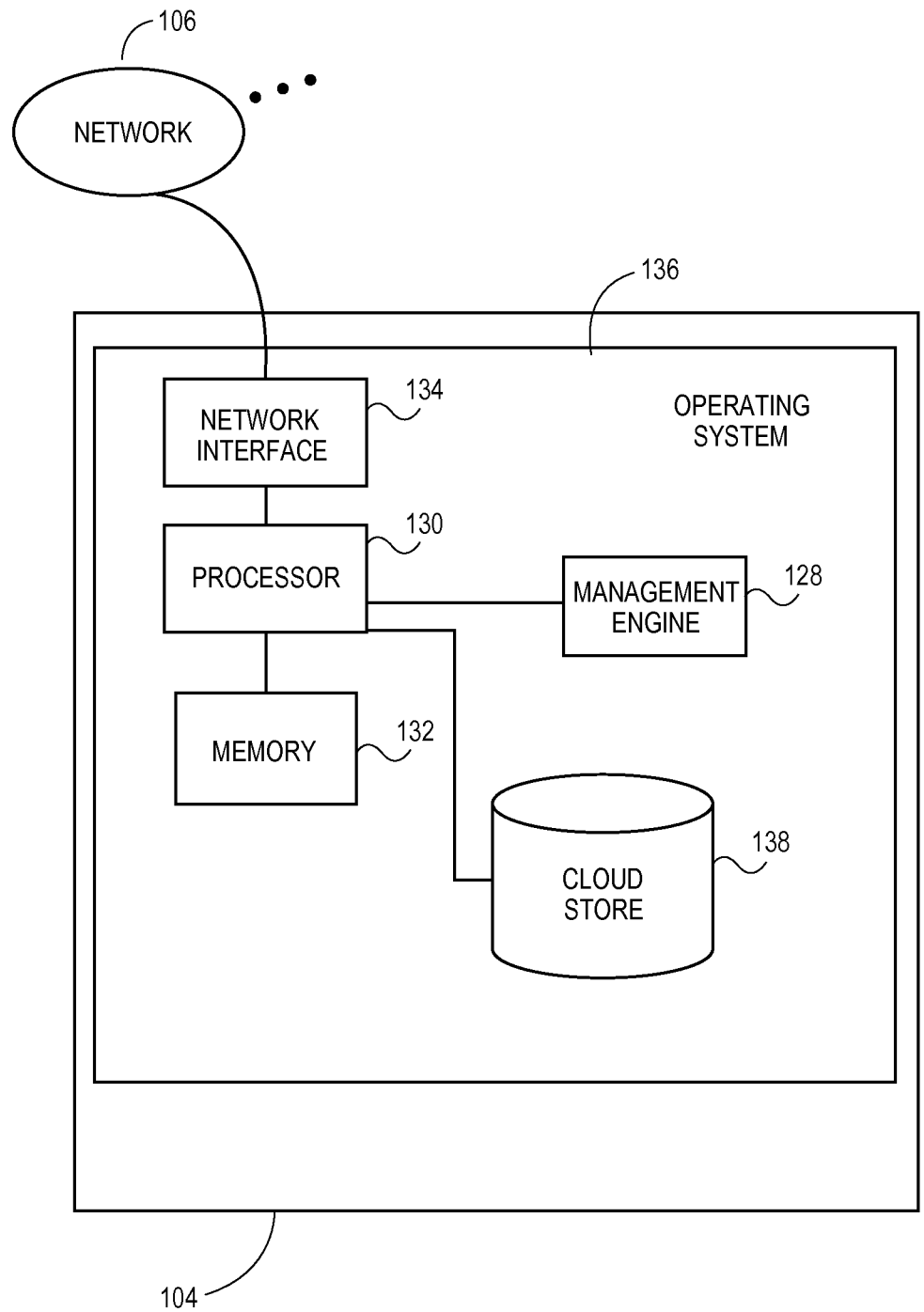
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with set of instantiated virtual machines 116 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with cloud store 138 and management engine 128, to execute control logic and control the operation of virtual machines and other resources in cloud 102. Other configurations of cloud management system 104, associated network connections, and other hardware and software resources are possible.

Figure 5:
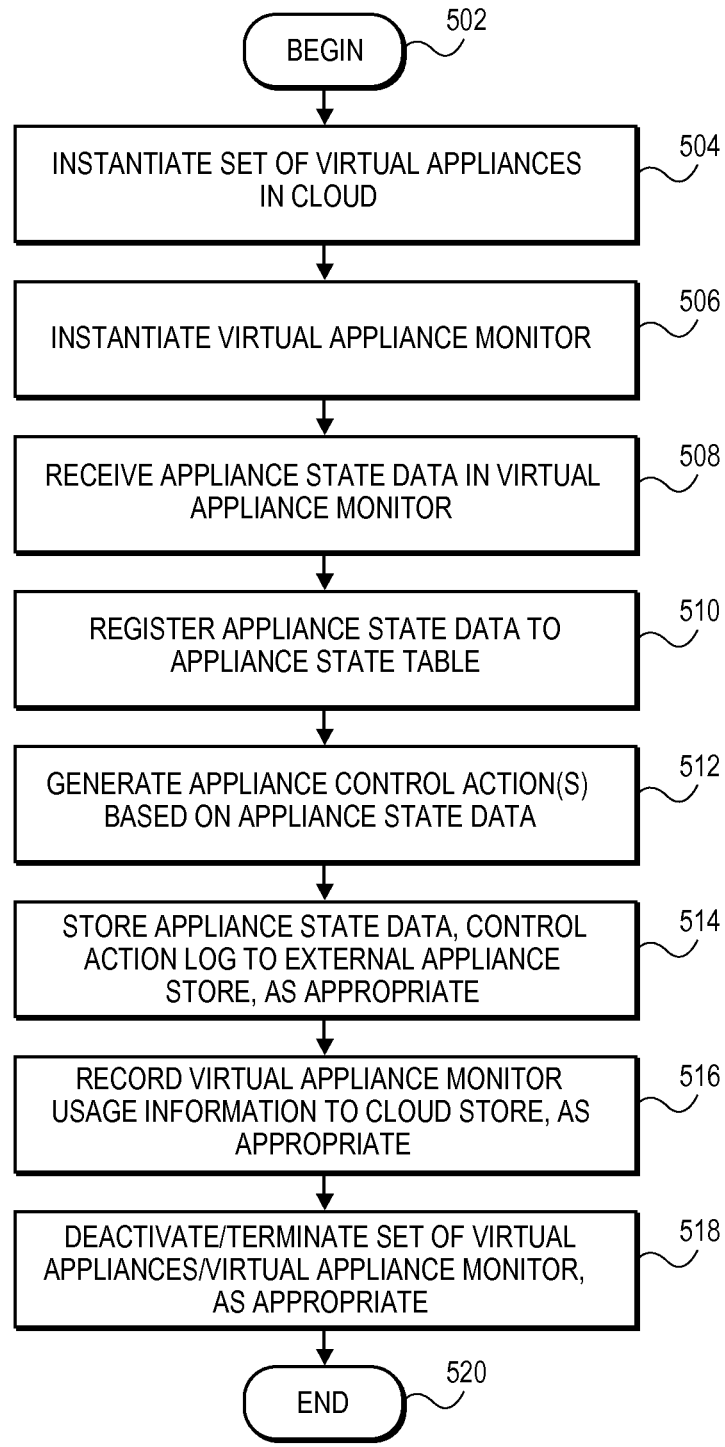
FIG. 5 illustrates a flowchart for overall appliance management processing in a cloud computing environment, according to various embodiments.

FIG. 5 illustrates a flow diagram of overall processing for the management of virtual appliances in a cloud-based network, according to embodiments. In step 502, processing can begin. In step 504, a set of virtual appliances 118 can be instantiated in cloud 102. In step 506, a virtual appliance monitor 112 can be instantiated, for example in cloud 102 or other cloud. In step 508, appliance state data 120 can be received from one or more appliances in set of virtual appliances 118. In step 510, the appliance state data 120 can be registered to an appliance state table 122, or other storage schema or media. For example, cloud management system 104 can store data to a virtual appliance ID field 124 and to appliance state fields 126 in appliance state table 122.

In step 512, one or more appliance control action(s) can be generated by virtual appliance monitor 112, based on appliance state data 120 and/or other information. For example, virtual appliance monitor 112 can transmit an instruction or command to cause set of applications 114 installed in set of virtual appliances 118 to be updated. For further example, virtual appliance monitor 112 can transmit an instruction or command to suspend or terminate an individual virtual appliance when a virus or other rogue process is detected in that machine. Other control, management, or supervisory actions can be taken.

In step 514, virtual appliance monitor 112 can store appliance state data 120 along with a log of any control action(s) taken to an external appliance store 140, as appropriate. External appliance store 140 can be a database or other storage facility located outside of or external to cloud 102. In step 516, cloud management system 104 can record usage information for virtual appliance monitor 112 to cloud store 138, as appropriate. For instance, for users or operators who employ virtual appliance monitor 112 on a subscription basis, the time usage, bandwidth usage, or other metering of the usage of virtual appliance monitor 112 can be recorded to accrue subscription charges, or for other purposes.

In step 518, the set of virtual appliances 118 and/or virtual appliance monitor 112 can be deactivated or terminated upon the expiration of a subscription period, or based upon other termination criteria. In step 520, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a set of virtual appliances are instantiated for use in one network cloud, in embodiments, the one or more sets of virtual appliances can be instantiated in multiple clouds. For further example, while embodiments have been described in which a single appliance monitor supervises the execution state of a set of virtual appliances, in embodiments multiple virtual appliance monitors can cooperate to manage one or more sets of virtual appliances. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
migrating an on-premise appliance monitor to a virtual appliance monitor in a network cloud, the migrating to instantiate the virtual appliance monitor in the network cloud;
receiving, by a virtual appliance monitor, appliance state information representing an execution state of a virtual appliance of a set of virtual appliances instantiated in the network cloud, wherein the virtual appliance monitor is instantiated separately from the set of virtual appliances and is to monitor the set of virtual appliances; and
performing, by the virtual appliance monitor, a control action to alter the execution state of the virtual appliance in response to conditions detected in the appliance state information.

2. The method of claim 1, further comprising storing the appliance state information to an appliance data store external to the network cloud.

3. The method of claim 1, wherein the appliance state information comprises at least one of an appliance ID, version data for the virtual appliance, an execution state of the virtual appliance, or an I/O state of the virtual appliance.

4. The method of claim 1, further comprising generating another control action comprising at least one of a termination instruction, a restart instruction, or a resource configuration instruction.

5. The method of claim 1, wherein each virtual appliance in the set of virtual appliances comprises at least one pre-configured application or a reduced operating system configured to support the at least one pre-configured application.

6. The method of claim 1, wherein the execution state of the virtual appliance comprises at least one of a version of the virtual appliance, a fault status of the virtual appliance, an infected status of the virtual appliance, or a privilege statue of the virtual appliance.

7. The method of claim 1, wherein the set of virtual appliances comprises a plurality of sets of virtual appliances, and wherein the network cloud comprises a plurality of clouds, the virtual appliance monitor monitoring the plurality of sets of virtual appliances in the plurality of clouds.

8. A system comprising:
a memory;
a network interface device communicably coupled to a set of virtual appliances instantiated in a network cloud;
a processor communicably coupled to the memory and the network interface device;
a cloud management server executable from the memory by the processor, the cloud management server to manage the network cloud; and
a virtual appliance monitor executable from the memory by the processor and communicably coupled to the network interface device and the cloud management server, the virtual appliance monitor migrated from an on-premise appliance monitor, the migrating to instantiate the virtual appliance monitor separately from the set of virtual appliances in the network cloud, wherein the virtual appliance monitor to:
monitor each virtual appliance of the set of virtual appliances;
receive appliance state information representing an execution state of a virtual appliance of the set of virtual appliances instantiated in the network cloud; and
perform a control action to alter the execution state of the virtual appliance in response to conditions detected in the appliance state information.

9. The system of claim 8, wherein the virtual appliance monitor is further to store the appliance state information to an appliance data store external to the network cloud.

10. The system of claim 8, wherein the appliance state information comprises at least one of an appliance ID of the virtual appliance, version data for the virtual appliance, an execution state of the virtual appliance, or an I/O state of the virtual appliance.

11. The system of claim 8, wherein the control action comprises at least one of a termination instruction, a restart instruction, or a resource configuration instruction.

12. The system of claim 8, wherein each virtual appliance in the set of virtual appliances comprises at least one pre-configured application and a reduced operating system configured to support the at least one pre-configured application.

13. The system of claim 8, wherein the set of virtual appliances comprises a plurality of sets of virtual appliances, and wherein the network cloud comprises a plurality of clouds, the virtual appliance monitor monitoring the plurality of sets of virtual appliances in the plurality of clouds.

14. The system of claim 8, wherein the execution state of the virtual appliance comprises at least one of a version of the virtual appliance, a fault status of the virtual appliance, an infected status of the virtual appliance, or a privilege statue of the virtual appliance.

* * * * *

UNITED STATES PATENT AND TRADEMARK OFFICE
CERTIFICATE OF CORRECTION

| | | |
|---|---|---|
| PATENT NO. | : 8,612,566 B2 | Page 1 of 1 |
| APPLICATION NO. | : 13/554394 | |
| DATED | : December 17, 2013 | |
| INVENTOR(S) | : James Michael Ferris et al. | |

It is certified that error appears in the above-identified patent and that said Letters Patent is hereby corrected as shown below:

In the Claims

In claim 6, column 10, line 35, delete "statue" and insert --status--; and

In claim 14, column 11, line 24, delete "statue" and insert --status--.

Signed and Sealed this
Ninth Day of September, 2014

Michelle K. Lee
*Deputy Director of the United States Patent and Trademark Office*